United States Patent
Kim et al.

(10) Patent No.: US 7,720,042 B2
(45) Date of Patent: May 18, 2010

(54) METHOD FOR TRANSMITTING AND RECEIVING DATA SIGNAL IN MIMO SYSTEM

(75) Inventors: Bong-Hoe Kim, Gyeonggi-Do (KR); Dong-Youn Seo, Seoul (KR); Dong-Hee Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/097,012

(22) Filed: Mar. 31, 2005

(65) Prior Publication Data

US 2005/0220065 A1 Oct. 6, 2005

Related U.S. Application Data

(60) Provisional application No. 60/559,332, filed on Apr. 2, 2004.

(51) Int. Cl.
 *H04B 7/208* (2006.01)
(52) U.S. Cl. .................................... 370/344; 455/522
(58) Field of Classification Search ................ 370/522, 370/334; 455/445, 522
 See application file for complete search history.

(56) References Cited

U.S. PATENT DOCUMENTS

| | | | | |
|---|---|---|---|---|
| 6,347,234 | B1* | 2/2002 | Scherzer | 455/562.1 |
| 6,859,503 | B2* | 2/2005 | Pautler et al. | 375/299 |
| 7,006,464 | B1* | 2/2006 | Gopalakrishnan et al. | 370/328 |
| 7,177,658 | B2* | 2/2007 | Willenegger et al. | 455/522 |
| 7,266,384 | B2* | 9/2007 | Kim et al. | 455/522 |
| 2001/0053143 | A1* | 12/2001 | Li et al. | 370/344 |
| 2002/0051433 | A1* | 5/2002 | Affes et al. | 370/335 |
| 2002/0061764 | A1* | 5/2002 | Kim et al. | 455/522 |
| 2002/0094834 | A1* | 7/2002 | Baker et al. | 455/522 |
| 2002/0159431 | A1* | 10/2002 | Moulsley et al. | 370/347 |
| 2002/0193146 | A1* | 12/2002 | Wallace et al. | 455/562 |
| 2003/0002472 | A1* | 1/2003 | Choi et al. | 370/347 |
| 2003/0043839 | A1* | 3/2003 | Luschi et al. | 370/445 |
| 2003/0043887 | A1* | 3/2003 | Hudson | 375/144 |
| 2003/0112773 | A1* | 6/2003 | Lee et al. | 370/318 |

(Continued)

FOREIGN PATENT DOCUMENTS

EP 1255369 A1 11/2002

*Primary Examiner*—Lester Kincaid
*Assistant Examiner*—Diego Herrera
(74) *Attorney, Agent, or Firm*—Lee, Hong, Degerman, Kang & Waimey

(57) ABSTRACT

Provided is a method for transmitting a data signal in a multiple-input multiple-output mobile communication system for transmitting and receiving the data signal by using a plurality of transmitting antennas and a plurality of receiving antennas, wherein when each data transmitted through the plurality of transmitting antennas is transmitted with respectively different control signals, the control signals are transmitted respectively through downlink control signal transport channels as many as the number of control signals. According to this, when information with respect to modulation methods and OVSF codes for each transmitting antenna in the MIMO system is different, it is possible to achieve efficient transmission and reception by using a method for transmitting the different information to a terminal. Furthermore, a backward compatibility between the MIMO system and the related art HSDPA system can be satisfied by using control channels similar to the control channels used in the related art HSDPA system, and the method can be unlimitedly applied to any case data is composed of one packet or of several packets.

3 Claims, 2 Drawing Sheets

U.S. PATENT DOCUMENTS

| | | |
|---|---|---|
| 2003/0123470 A1* | 7/2003 | Kim et al. .................. 370/437 |
| 2003/0128678 A1* | 7/2003 | Subrahmanya et al. ...... 370/335 |
| 2003/0147371 A1* | 8/2003 | Choi et al. .................. 370/341 |
| 2003/0157954 A1 | 8/2003 | Medvedev |
| 2003/0189918 A1* | 10/2003 | Das et al. .................... 370/349 |
| 2003/0207696 A1* | 11/2003 | Willenegger et al. ........ 455/522 |
| 2003/0235147 A1* | 12/2003 | Walton et al. ............... 370/204 |
| 2004/0009755 A1* | 1/2004 | Yoshida ...................... 455/101 |
| 2004/0066754 A1* | 4/2004 | Hottinen ..................... 370/252 |
| 2004/0102202 A1* | 5/2004 | Kumaran et al. ............ 455/515 |
| 2004/0114529 A1* | 6/2004 | Dong-Hi et al. ............. 370/249 |
| 2004/0253955 A1* | 12/2004 | Love et al. ................... 370/442 |
| 2004/0266471 A1* | 12/2004 | Boariu et al. ............... 455/522 |
| 2005/0009476 A1* | 1/2005 | Wu et al. ..................... 455/101 |
| 2005/0013263 A1* | 1/2005 | Kim et al. ................... 370/320 |
| 2005/0025090 A1* | 2/2005 | Klein et al. .................. 370/328 |
| 2005/0219999 A1* | 10/2005 | Kim et al. ................... 370/207 |

* cited by examiner

METHOD FOR TRANSMITTING AND RECEIVING DATA SIGNAL IN MIMO SYSTEM

CROSS-REFERENCE TO RELATED APPLICATIONS

Pursuant to 35 U.S.C. §119(a), this application claims the benefit of earlier filing date and right of priority to U.S. Provisional Application No. 60/559,332, filed on Apr. 2, 2004; the contents of which is hereby incorporated by reference herein in its entirety.

BACKGROUND OF THE INVENTION

1. Field of the Invention

The present invention relates to a method for transmitting a signal from a transmitting end in a multiple-input multiple-output (MIMO) mobile communication system which commonly uses a plurality of antennas at transmitting and receiving ends thereof.

2. Description of the Conventional Art

In this technical field, a multiple-input multiple-output (MIMO) mobile communication system has been known to be able to achieve remarkably improved properties compared with a single antenna system, namely, a single antenna versus single antenna or a single antenna versus plural antenna system. However, in order to achieve these improved properties, preferably, various signals which reach a plurality of receiving antennas are not correlated therebetween under substantial dispersion conditions, and when ignoring correlation between those signals even if the signals have some degree of correlation therebetween, performances of the system are degraded and capabilities thereof are decreased.

A related art multiple-input multiple-output mobile communication system (MIMO system) will be described in accordance with an embodiment as follows.

FIG. 1 illustrates a structure of a vertical bell laboratories space time (V-BLAST) system which is one of conventional arts of a multiple-input multiple-output (MIMO) mobile communication system.

The structure of a vertical bell laboratories space time (V-BLAST) system which is one of related arts of a MIMO system will be explained with reference to FIG. 1 as follows. The V-BLAST system belongs to the MIMO system, a technique including a plurality of transmitting/receiving antennas. Thus, the V-BLAST system uses M-numbered antennas at its transmitting end and N-numbered antennas at its receiving end. In this case, N≧M is assumed.

At the transmitting end, in order to transmit data, which is sequentially generated, with respect to data to be transmitted, a transmission data 11 pass through a vector encoder 10 (that is, the vector encoder 10 allows the data which is sequentially generated to pass through a serial-to-parallel circuit in order to transmit in parallel the data from each antenna), and accordingly different signals therebetween are transmitted from each antenna.

Here, modulation methods and the number of channelization codes of data transmitted to each antenna can be differently established, respectively. At this time, the channelization codes refer to codes having orthogonal properties as same as OVSF codes.

That is, when using a plurality of transmitting antennas 12, an additional signal processing or space-time code is not used, but each different signal with respect to data simply inputted is transmitted from different antennas. In other words, a transmitting end does not require the additional signal processing using correlation between antennas in order to improve a transmission quality.

That is, the transmitting end transmits different signals from respectively different antennas by using a plurality of antennas. The receiving end then receives the signals transmitted from the transmitted end through many antennas by using a separate algorithm, and appropriately detects the signals which have been differently transmitted through respectively different antennas at the transmitting end.

A V-BLAST receiving end signal processor 18 at the receiving end shown in FIG. 1 is for detecting signals which have been differently transmitted through M-numbered antennas, respectively, at the receiving end.

Now, on the other hand, an operation of the V-BLAST system will be described in more detail. A transmitting end of the V-BLAST system allows different signals to be transmitted from respectively different antennas with respect to data simply inputted, without using a diversity transmission technique such as an additional signal processing or a space-time code which uses correlation between antennas in each transmitting antenna.

At this time, modulation methods and the number of channelization method such as OVSF codes can be differently established for each antenna.

That is, if a downlink channel condition transmitted from a transmitting end antenna is known, data with a QAM modulation method and a high coding rate can be transmitted by using many OVSF codes with respect to antennas in a good channel condition, while in a bad channel condition, data with a QPSK modulation method and a low coding rate can be transmitted by using a few OVSF codes.

As a result, the transmitting end, as aforementioned, allows transmissions of respectively different signals from respectively different antennas by changing the modulation methods or the number of OVSF codes for each signal, and the receiving end detects signals having transmitted from each transmitting antenna through an appropriate signal processing.

Furthermore, explaining the appropriate signal processing at the receiving end, when detecting a signal transmitted from a specific transmitting antenna, a signal transmitted from another transmitting antenna is regarded as an interference signal. Afterwards, a weight vector of a receiving array antenna of the receiving end is calculated with respect to each signal transmitted from each antenna, and an influence of the previously-detected signal upon the receiving end is removed. As well as this method, a method for detecting signals transmitted from each transmitting antenna in the order of signals having a great signal-to-interference noise ratio can be used.

As above, when each transmitting antenna has different modulation method, coding rate, and the number of OVSF codes, information thereof has to be transmitted to a terminal over a downlink.

In the related art HSDPA (High Speed Downlink Packet Access) system, the information is transmitted through a HS-SCCH (HSDPA-Shared Control Channel). However, such HSDPA system does not assume a system structure having a plurality of transmitting/receiving antennas such as the MIMO system, information only for one antenna is transmitted through the HS-SCCH.

Unlike the HSDPA system, in the MIMO system, there can be established modulation methods, coding rates, the number of OVSF codes, or the like for the plurality of transmitting antennas, respectively. As a result, a control signal for each antenna is required.

SUMMARY OF THE INVENTION

Therefore, an object of the present invention is to provide a method for transmitting a downlink control signal in a multiple-input multiple-output (MIMO) mobile communication system, by which transmission and reception can efficiently be carried out by proposing a method, wherein when different modulation methods, OVSF codes and the like are established for each transmitting antenna, the established information is transmitted to a terminal through a plurality of control channels.

To achieve these and other advantages and in accordance with the purpose of the present invention, as embodied and broadly described herein, there is provided a method for transmitting a data signal in a multiple-input multiple-output mobile communication system for transmitting/receiving the data signal by using a plurality of transmitting antennas and a plurality of receiving antennas, wherein when each data to be transmitted through the plurality of transmitting antennas is transmitted with each different control signal, the respectively different control signals are transmitted through downlink control signal transport channels as many as the number of control signals.

Preferably, each channel of the downlink control signal transport channels transmits the same terminal ID.

Preferably, the specific terminal is a specific receiving end designated to receive predetermined data which is transmitted through the plurality of transmitting antennas.

Preferably, in the respective downlink control signal transport channels, each control signal is transmitted by using a new combination for a field including a part to which the specific terminal ID is scrambled.

Preferably, the control signal is control information for modulation methods and/or the number of channalization codes respectively different in each receiving antenna and retransmission, and the channelization codes have orthogonal properties as same as OVSF codes.

According to another embodiment of the present invention, there is provided a method for receiving a data signal in a multiple-input multiple-output mobile communication system for transmitting/receiving the data signal by using a plurality of transmitting antennas and a plurality of receiving antennas, the method comprising the steps of: receiving at least two control signals different from each other through the plurality of receiving antennas by downlink control signal transport channels and inputting control information for data signals; receiving each data signal transmitted through the plurality of receiving antennas; and decoding the data signals corresponding to the control signal channels by the corresponding control information.

Preferably, the control signals received through the downlink control signal transport channels are descrambled using the same code.

Preferably, the same code is a specific terminal ID of the receiving end, the control signal is control information of modulation methods and/or the number of channelization codes respectively different in each receiving antenna and retransmission, and the channelization code is such a code having orthogonal properties as same as an OVSF code.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Before explaining an embodiment of the present invention, the related art HSDPA (High Speed Downlink Packet Access) system and a channel structure thereof will be described.

The HSDPA system refers to a data transmission method including a HSDPA downlink shared channel (HS-DSCH) which is a downlink data channel for supporting a downlink high speed packet data transmission and a HSDPA shared control channel (HS-SCCH) which is a control channel associated with the HS-DSCH in a UMTS (Universal Mobile Telecommunications system) communications system, a next generation asynchronous mobile communications system.

The HSDPA system rapidly provides not only a conventional packet data service but also a service provided by changing voice into an internet protocol packet. For these services, there are required various functions such as an adaptive modulation and coding (AMC), a hybrid automatic retransmission request (HARQ), and the like, all which will be explained in more detail as follows.

An AMC is a method for varying modulation and a coding rate of a signal is to be transmitted according to a signal quality received from a terminal and a channel condition. That is, high modulation and coding rate are allocated with respect to a terminal positioned close to a base station, and low modulation and coding rate are allocated with respect to a terminal positioned far from the base station. In this method, a transmitting end changes the modulation methods and the coding methods of data according to radio circumstances and an amount of data to be transmitted. Here, the modulation methods which are being used are 4 QAM and 16 QAM.

Furthermore, a HARQ includes two different methods. One is a chase combining method, and the other method is an IR (Incremental redundancy) method. In these methods, when a received data contains error, an FEC (Forward Error Correction) function is included in an ARQ function for retransmission. The ARQ method considered by the HSDPA system is the IR method.

In order to apply those methods, the HSDPA system can additionally consider control channels in addition to the HS- DSCH channel. These control channels must include a HS-SCCH channel which is a channel for transferring a control message of the HSDPA.

Figure 2:
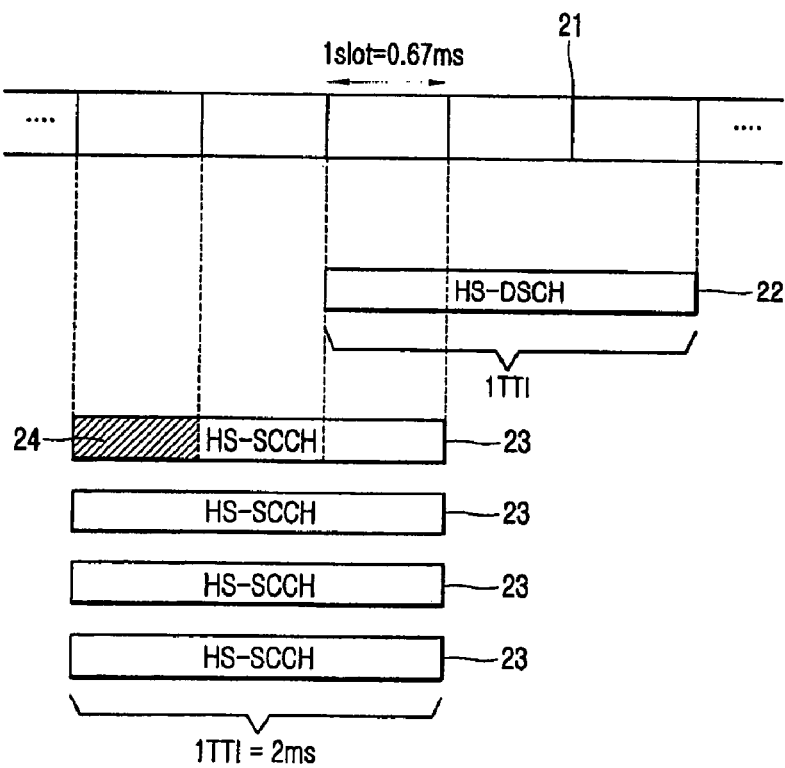
FIG. 2 illustrates a schematic channel structure of a typical HSDPA system.

FIG. 2 illustrates a schematic channel structure of a typical HSDPA system.

Referring to FIG. 2, reference numeral 21 refers to one time slot in a time slot format of a downlink shared channel (DSCH).

A channel structure of a typical HSDPA system includes a HSDPA downlink shared channel (HS-DSCH) 22 and a HSDPA shared control channel (HS-SCCH) 23, namely, a control channel associated with the HS-DSCH 22. These downlink channels, the HS-DSCH 22 and the HS-SCCH 23, are not transmitted in a state that their slot boundaries are exactly aligned. The HS-SCCH 23 is always transmitted by being overlapped with only one slot of the HS-DSCH 22. Therefore, rear one slot of three slots of the HS-SCCH 23 is overlapped with front one slot of three slots of the HS-DSCH 22 so as to be transmitted. As a result, the HS-SCCH 23 is always transmitted earlier than the HS-DSCH 22.

Furthermore, the HS-DSCH 22 can use a DSCH as it is, which is used in an asynchronous code division multiple access system, or use the DSCH by varying it, and is used for transmitting the HSDPA service data. Pure data is transmitted through the HS-DSCH 22, while a control signal for the HS-DSCH 22 is transmitted through the HS-SCCH 23.

As a result, in the HSDPA system, information of modulation and coding rate which are determined by applying the AMC method, namely, the control signal is transmitted through the HS-SCCH 23.

Here, the control signal refers to information for channelization codes, modulation methods, packet sizes to be transmitted, retransmission in an erroneous reception, information for identifying each terminal, and the like. The control signal is transmitted over a downlink through on the HS-SCCH 23.

A process of transmitting the control signal with respect to the specific terminal of the base station through the HS-SCCH 23 will be explained as follows.

The base station allocates a plurality of HS-SCCHs 23 to a terminal, namely, each user of the HSDPA system, and each terminal monitors the plurality of HS-SCCHs 23 allocated. In general, in the related art HSDPA system, less than 4 HS-SCCHs 23 are allocated to each terminal.

Afterwards, when the base station needs to transmit data to a specific terminal, a control signal for the data is first transmitted after scrambling the specific terminal ID 24 to one of the plurality of HS-SCCHs allocated The specific terminal checks its terminal ID 24 and receives the control signal for the one HS-SCCH 23 allocated to the terminal itself.

After the specific terminal then receives the control signal for the one HS-SCCH 23 allocated to the terminal itself, the terminal receives data which is transmitted two slots later than the HS-SCCH 23 through the HS-DSCH 22.

However, unlike the MIMO system, because a system structure having the plurality of transmitting/receiving antennas is not assumed in the HSDPA system, information of only one antenna is transmitted through the HS-SCCH 23. Therefore, it can not be applied to the MIMO system.

For this, the present invention relates to a multiple-input multiple-output mobile communication system (MIMO system) of which transmitting end and receiving end commonly use a plurality of antennas, and more particularly, a method for transmitting control information such as modulation methods or coding rates separately applied to each data, which is transmitted from a plurality of transmitting antennas, through one or a plurality of channels.

Hereinafter, it will be explained of a method for transmitting a data signal in a MIMO system in accordance with embodiments of the present invention with reference to the accompanying drawings.

In the present invention, it is assumed that a MIMO system has M-numbered transmitting antennas and N-numbered receiving antennas ($M \leq N$).

In addition, in the system assumed in the present invention, when a transmitting end transmits a signal, there is considered in each antenna that a packet to be transmitted is transmitted with CRC (Cyclic Redundancy Check) or a packet with one CRC is divided to be transmitted to several antennas. Here, the CRC refers to a method in which a cyclic binary code is used for detecting error which may occur during data transmissions.

Figure 1:
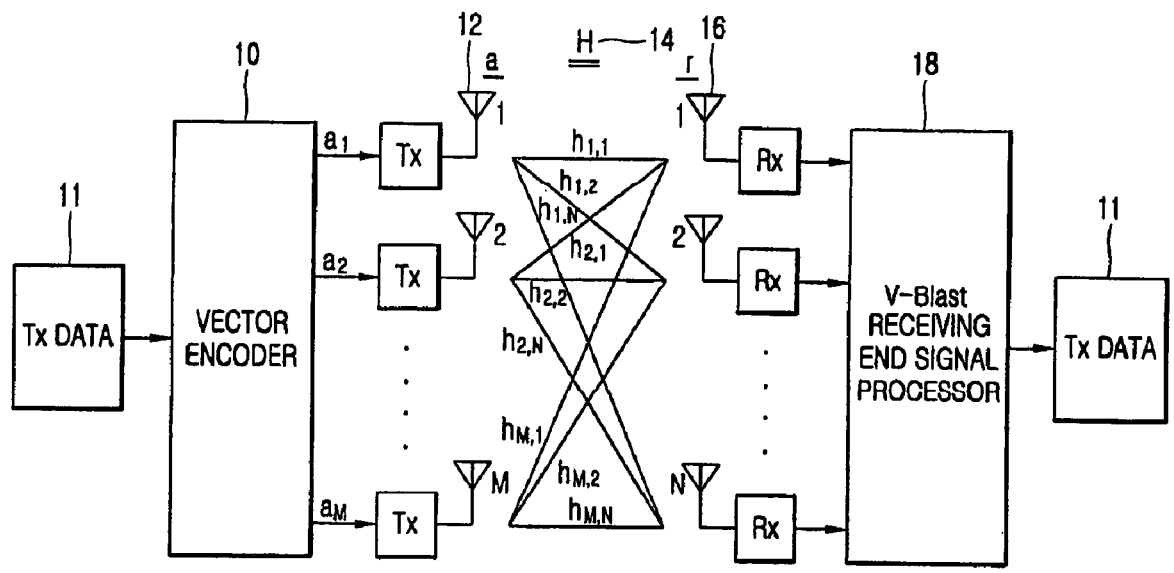
FIG. 1 illustrates a structure of a vertical bell laboratories layered space time (V-BLAST) system, one of related arts of a multiple-input multiple-output mobile communication system.

A structure of the MIMO system according to the present invention has the almost same structure as the MIMO system shown in FIG. 1. In this MIMO system, unlike the related art MIMO system, when a control signal such as modulation methods, coding rates, the number of OVSF codes, and the like are differently established respectively for a plurality of transmitting antennas so as to be transmitted, a specific control channel is used therefor.

Figure 3:
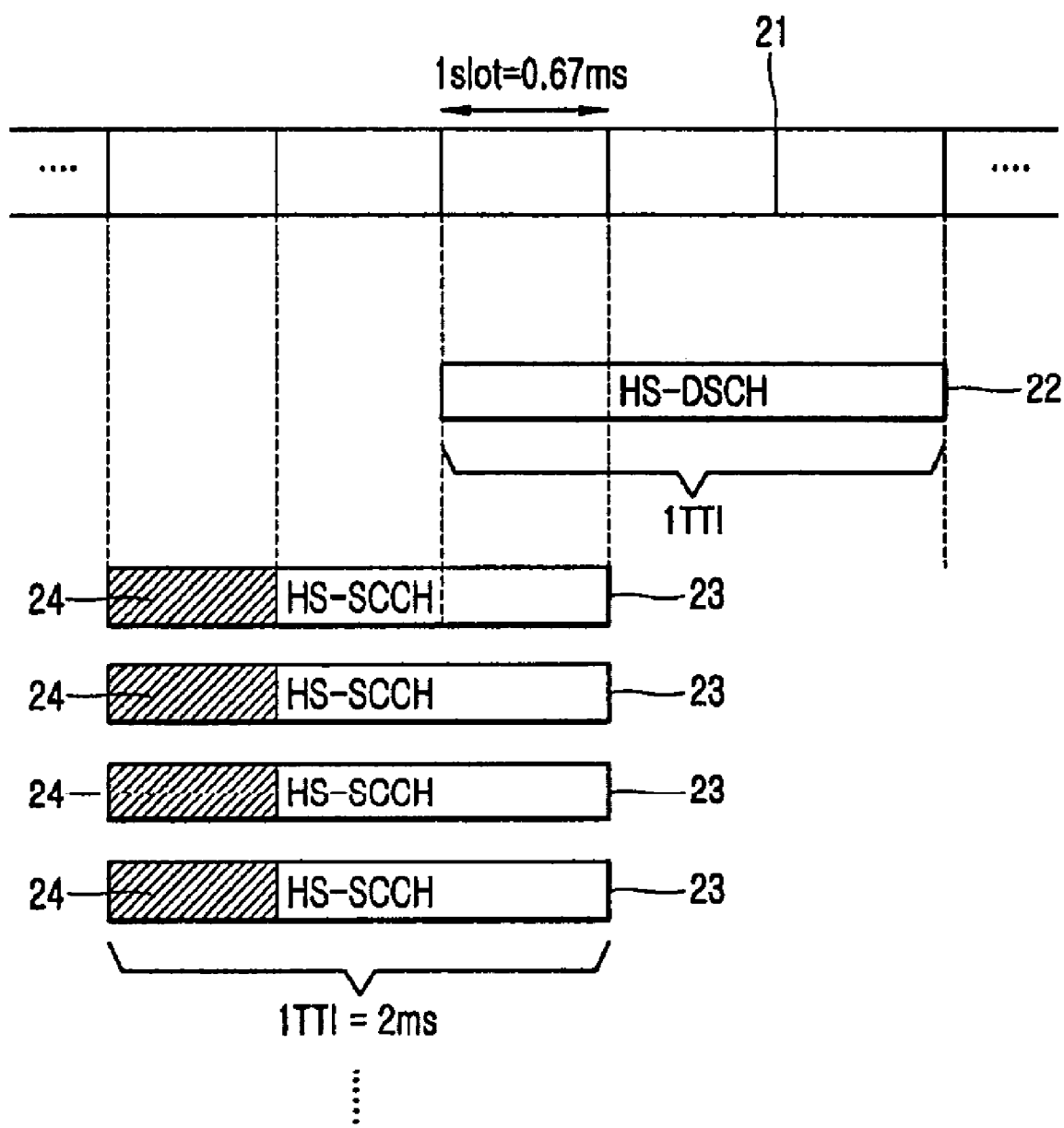
FIG. 3 illustrates downlink control signal transport channels in a MIMO system in accordance with an embodiment of the present invention.

FIG. 3 illustrates downlink control signal transport channels in a MIMO system in accordance with an embodiment of the present invention.

In the MIMO system, when M-numbered transmitting antennas and N-numbered receiving antennas are used for transmitting predetermined data, in order to transmit data to be transmitted, namely, data which is sequentially generated, from each transmitting antenna at the transmitting end, the data to be transmitted is divided into m-numbered data passing through a vector encoder and then transmitted through each antenna.

Here, the control signals such as modulation methods and the number of channelization codes of data to be transmitted to each transmitting antenna, retransmission in an erroneous transmission, or the like, can be differently allocated, respectively. When the control signals are transmitted over a downlink, one or several control channels are required.

That is, when control signals to be transmitted through each transmitting antenna are all the same, the control signals can be transmitted through one control channel. However, in other cases, several control channels are required.

At this time, the channelization codes refer to codes having orthogonal properties as same as OVSF codes.

Moreover, a scheduler of a base station determines the modulation method and the number of OVSF codes for each transmitting antenna. Here, each transmitting antenna can have different modulation method and the number of OVSF codes. When data to be transmitted through each transmitting antenna is transmitted with a CRC, respectively, a receiving end checks whether an error occurs or not. As a result, it is possible to differently establish whether the erroneous data is to be retransmitted.

That is, the control signals such as information of modulation methods and the number of OVSF codes, a size of transmission block, information of retransmission, and the like, are required to be transmitted to a terminal by each transmitting antenna.

For this purpose, in the embodiment of the present invention, the control signals are transmitted by a method similar to the method in the HSDPA system in which HS-SCCH is used for transmitting a downlink control signal. That is, as shown in FIG. 3, the control signals are transmitted by using one or a plurality of downlink control signal transport channels (HS-SCCHs) 23.

In other words, when more data to be transmitted by each antenna is more required in a method having used one of the plurality of HS-SCCHs 23 to be monitored in a downlink control signal transmission of the related art HSDPA system, that is, in case of the MIMO system using a plurality of transmitting antennas, the HS-SCCHs 23 as many as being required among the residual HS-SCCHs 23, which are being monitored to a user, are used, which will be explained in more detail as follows.

In the MIMO system, as aforementioned, when transmitting data, the data is divided into the M-numbered data passing through the vector encoder, so as to be transmitted through each transmitting antenna.

Accordingly, control information can be differently allocated by each data transmitted from each transmitting antenna. As a result, in order to transmit control signals to a terminal according to the data transmissions, unlike the HSDPA system in which a terminal ID is scrambled to only one of the plurality of HS-SCCHs 23 so as to be transmitted, there are required the HS-SCCHs 23 as many as enabling the transmission of respectively different control signals in the present invention.

In the present invention for this purpose, among the HS-SCCHs 23 which are being monitored in the related art HSDPA system, the HS-SCCHs 23 as many as the number of the different control signals are further used. In order to further use the HS-SCCHs 23 which are being monitored, the same terminal ID is transmitted by being scrambled to the plurality of HS-SCCHs 23.

That is, when a control signal is transmitted through one HS-SCCH 23, the control signal is transmitted by a code structure as same as that of the related art HSDPA system. Also, when different control signals are transmitted through at least two HS-SCCHs 23, the different control signals are transmitted by the same code structure as that of the related art HSDPA system, excluding that the same terminal ID is transmitted by being scrambled to the at least two HS-SCCHs 23.

Here, when the different control signals are transmitted through the at least two HS-SCCHs 23, the respective control signals can be transmitted by a new combination of information required with respect to a field of a channel including a part to which the terminal ID 24 is scrambled.

Now, a process that a base station transmits the control signals to a specific terminal through HS-SCCHs in a MIMO system according to the present invention will be described as follows.

A base station allocates a plurality of HS-SCCHs 23 to each terminal, and the terminals monitor the plurality of HS-SCCHs 23 allocated. In general, in the related art HSDPA system, less than four HS-SCCHs 23 are allocated with respect to each terminal. However, this is just one example therefor, and the number of the HS-SCCHs 23 which the terminal monitors is not limited on four.

Afterwards, when the base station is required to transmit data to a specific terminal, the base station first transmits a control signal for the data. At this time, the data is transmitted through a plurality of transmitting antennas, and, in this case, as aforementioned, the control signal therefor can be differently allocated by each transmitting antenna.

For instance, when more than two distinguishable control signals are transmitted by each transmitting antenna, HS-SCCHs 23 corresponding to the number of control signals to be transmitted, that is, the HS-SCCHs 23 as many as the number of the distinguishable control signals are selected from the plurality of HS-SCCHs 23 which the terminal monitors. Thereafter, the control signals are transmitted after scrambling a terminal ID 24 with respect to the specific terminal to the selected HS-SCCHs 23.

That is, when the different control signals are transmitted through more than two HS-SCCHs 23, the same code structure as that of the related art HSDPA system is used, excluding that the control signals are transmitted after scrambling the same terminal ID 24 with respect to the specific terminal to the more than two HS-SCCHs 23.

In this case, however, the respective control signals can be transmitted by a new combination of information required for a field of a channel including a part to which the same terminal ID is scrambled.

Accordingly, after the specific terminal receives control signals of the plurality of HS-SCCHs 23 allocated to the terminal itself, the terminal receives data to be transmitted two slots later than the plurality of HS-SCCHs 23 through a HS-DSCH 22 from a plurality of transmitting antennas.

Furthermore, when only one control signal is required even if using a plurality of transmitting antennas, the control signal is transmitted through one HS-SCCH 23. At this time, the control signal is transmitted by the same code structure as that of the related art HSDPA system so as to completely satisfy a backward compatibility of the related art. As a result, in this case, the HS-SCCHs have the same structure as that shown in FIG. 2.

Next, a method for receiving data in a MIMO system according to the present invention will be explained.

A receiving end of the MIMO system according to the present invention includes a plurality of receiving antennas, a decoding unit for decoding a data signal, and a multiplexer, and detects a first-transmitted data therethrough.

Furthermore, in the present invention, before receiving the data signal, a control signal therefor is previously received, which process will briefly be explained as follows. That is, the receiving end descrambles the HS-SCCHs transmitted from the base station, at which the HS-SCCHs are monitored, by using a specific terminal ID allocated to each receiving end, and detects an obtained path metric of each HS-SCCH. When the path metric is detected under a predetermined threshold value, the value is recognized as a HS-SCCH transmitted by being scrambled using its ID. At this time, the recognized HS-SCCH decodes a control signal of a combination agreed with the transmitting end.

Hereinafter, explaining in more detail of a method for receiving data according to the present invention, the method therefor includes the steps of receiving more than two control signals different from each other through the plurality of receiving antennas by downlink control signal transport channels and inputting control information with respect to data signals, receiving each data signal transmitted through the plurality of receiving antennas, and decoding the data signals corresponding to the control signal channels with the corresponding control information.

At this time, the control signal channels, namely, control signals received through the HS-SCCHs are descrambled by using the same code, which is a specific terminal ID of the receiving end.

In addition, the control signal refers to control information of modulation methods and/or the number of channelization codes respectively different in each receiving antenna, and retransmission, and the channelization codes refer to codes having orthogonal properties as same as OVSF codes.

As described above, by the method for transmitting a downlink control signal in a multiple-input multiple-output (MIMO) mobile communication system according to the present invention, when information with respect to modulation methods and OVSF codes for each transmitting antenna in the MIMO system is different, it is possible to achieve efficient transmission and reception by using a method for transmitting the different information to a terminal.

Furthermore, a backward compatibility between the MIMO system and the related art HSDPA system can be satisfied by using similar control channels as the control channels used in the related art HSDPA system, and the method can be unlimitedly applied to any case that data is composed of one packet or of several packets.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for transmitting a data signal in a multiple-input multiple-output mobile communication system comprising:
   communicating the data signal using a plurality of transmitting antennas and a plurality of receiving antennas; and
   communicating a control signal using the plurality of transmitting antennas and the plurality of receiving antennas,
   wherein each data signal is transmitted through the plurality of transmitting antennas,
   wherein each transmitting antenna respectively transmits the data signal with different control signals,
   wherein the control signals are transmitted through at least one downlink control signal transport channel,
   wherein the control signal comprises control information associated with one or more modulation methods or control information associated with the number of channelization codes that are respectively different in each transmitting antenna, and retransmission,
   wherein the channelization code is a code having same orthogonal properties as an OVSF code,
   wherein each channel of the downlink control signal transport channels transmits the same terminal ID, and
   wherein in the respective downlink control signal transport channels, each control signal is transmitted by using a new combination with respect to a field of each channel including a part to which the specific terminal ID is scrambled.

2. The method of claim 1, wherein the specific terminal is a specific receiving end designated to receive predetermined data transmitted through the plurality of transmitting antennas.

3. A method for receiving a data signal in a multiple-input multiple-output mobile communication system for transmitting and receiving the data signal by using a plurality of transmitting antennas and a plurality of receiving antennas, the method comprising:
   receiving more than two control signals different from each other through the plurality of receiving antennas by at least one downlink control signal transport channel and inputting control information with respect to data signals,
   receiving each data signal transmitted through the plurality of receiving antennas, and
   decoding the data signals corresponding to the control signal channels with corresponding control information,
   wherein the control signal comprises control information associated with modulation methods or control information associated with the number of channelization codes respectively different in each receiving antenna, and retransmission,
   wherein the control information relates to each of the plurality of transmitting antennas,
   wherein the channelization code is a code having the same orthogonal properties as an OVSF code,
   wherein the control signals received through the downlink control signal transport channels are descrambled by using the same code, and
   wherein the same code is a specific terminal ID of the receiving end.

* * * * *